(12) United States Patent
Johnson

(10) Patent No.: US 6,608,614 B1
(45) Date of Patent: Aug. 19, 2003

(54) LED-BASED LCD BACKLIGHT WITH EXTENDED COLOR SPACE

(75) Inventor: Rick J. Johnson, Marion, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 28 days.

(21) Appl. No.: 09/602,066

(22) Filed: Jun. 22, 2000

(51) Int. Cl.[7] ................................................ G09G 3/36
(52) U.S. Cl. ............................ 345/102; 345/83; 362/30
(58) Field of Search ........................... 345/102, 82, 83, 345/46, 48, 39, 49, 690; 349/61; 362/30, 246, 247, 248, 800

(56) References Cited

U.S. PATENT DOCUMENTS

| | | | | |
|---|---|---|---|---|
| 4,959,642 A | * | 9/1990 | Sharples | 345/5 |
| 5,724,062 A | * | 3/1998 | Hunter | 345/102 |
| 6,007,209 A | * | 12/1999 | Pelka | 362/30 |
| 6,115,016 A | * | 9/2000 | Yoshihara et al. | 345/88 |
| 6,243,068 B1 | * | 6/2001 | Evanicky et al. | 345/102 |

FOREIGN PATENT DOCUMENTS

JP  5-289076 A  * 11/1993

* cited by examiner

Primary Examiner—Steven Saras
Assistant Examiner—Amr Awad
(74) Attorney, Agent, or Firm—Nathan O. Jensen; Kyle Eppele

(57) ABSTRACT

A backlight for a liquid-crystal display is disclosed. The backlight includes a first LED array that provides light with a first chromaticity and a second LED array that provides light with a second chromaticity. A combining element combines the light from the first LED array and the second LED array and directs the combined light toward the liquid crystal display. A control system is operationally connected to the second LED array. The controller adjusts the brightness of at least one LED in the second LED array to thereby adjust the chromaticity of the combined light.

16 Claims, 5 Drawing Sheets

LED-BASED LCD BACKLIGHT WITH EXTENDED COLOR SPACE

FIELD OF THE INVENTION

The present invention relates to displays, and more particularly, to an LED-based backlight for a liquid-crystal display (LCD).

BACKGROUND OF THE INVENTION

Light-emitting diodes (LEDs) have been proposed for use as a backlighting source for liquid crystal displays (LCDs). Compared to conventional backlights that use fluorescent lamps, LEDs are less expensive, last longer, contribute to a more robust design, and provide a higher brightness-to-size ratio. Specifically, arrays of LEDs emitting white light show promise as LCD backlights.

Some applications require the light emitted from an LCD backlight to possess a specific chromaticity. This is important in fields such as avionics, where the colors displayed on a critical-function aircraft display must be exact. A slight difference in chromaticity of the backlight might adversely affect the color of the display. However, most commercially-available LEDs are produced with a limited number of chromaticity choices.

Furthermore, available LEDs are typically mass-produced and exhibit chromaticities within a certain range. This means that even if the rated chromaticity of an available LED matches the chromaticity requirements for an LCD backlight design, the rated chromaticity may be different from the actual chromaticity. In an array of white LEDs, there may be many individual LEDs that do not match the rated chromaticity, and the total chromaticity of the array may therefore not be predictable.

Another problem is that notwithstanding the long life exhibited by LED's, there may be some change in LED chromaticity over time. The chromaticity may also be affected by variations in temperature. Additionally, there is the chance that one or more LEDs in an array may be faulty and either fail prematurely or emit light with an unintended chromaticity. In either case the chromaticity of the entire array may be affected. In demanding applications such as avionics it is possible that such a chromaticity change would necessitate untimely repair or removal of the backlight.

It is therefore an object of the invention to extend the range of chromaticities that can be supplied by an LED-based LCD backlight.

It is another object of the invention to compensate for naturally occurring variations in the manufacture of LEDs so that light with a predictable chromaticity is supplied.

It is another object of the invention to extend the useful lifetime of an LED-based LCD backlight.

A feature of the invention is the varying of the brightness of a first set of LEDs relative to the brightness of a second set of LEDs to adjust the chromaticity of the combined light from the first and second sets of LEDs.

An advantage of the invention is that commonly available LEDs may be used in an LCD backlight even if the chromaticity of the commonly available LEDs is different from the desired chromaticity.

SUMMARY OF THE INVENTION

The invention provides a backlight for a liquid-crystal display. The backlight includes a first LED array that provides light with a first chromaticity and a second LED array that provides light with a second chromaticity. A combining element combines the light from the first LED array and the second LED array and directs the combined light toward the liquid crystal display. A control system is operationally connected to the second LED array. The controller adjusts the brightness of at least one LED in the second LED array, thereby adjusting the chromaticity of the combined light.

The invention also provides a system for adjusting the chromaticity of an LCD backlight, wherein the backlight provides combined light from a principal LED array and a secondary LED array. The system includes a controller that is operationally connected to the secondary LED array. The controller includes a processor that calculates the chromaticity difference between a target chromaticity of the combined light and an actual chromaticity of the combined light. The controller adjusts the brightness of the secondary LED array to reduce the chromaticity difference.

The invention further provides a method of adjusting the chromaticity of an LCD backlight, wherein the backlight provides light combined from a first LED array and a second LED array. According to the method, a target chromaticity for the LCD backlight is obtained. An actual chromaticity of the LCD backlight is determined. The difference between the target chromaticity and the actual chromaticity is calculated. The brightness of at least one LED in the second LED array is adjusted, thereby changing the chromaticity of the light combined from the first and second LED arrays and decreasing the difference between the target chromaticity and the actual chromaticity.

DETAILED DESCRIPTION OF THE DRAWINGS

Figure 1:
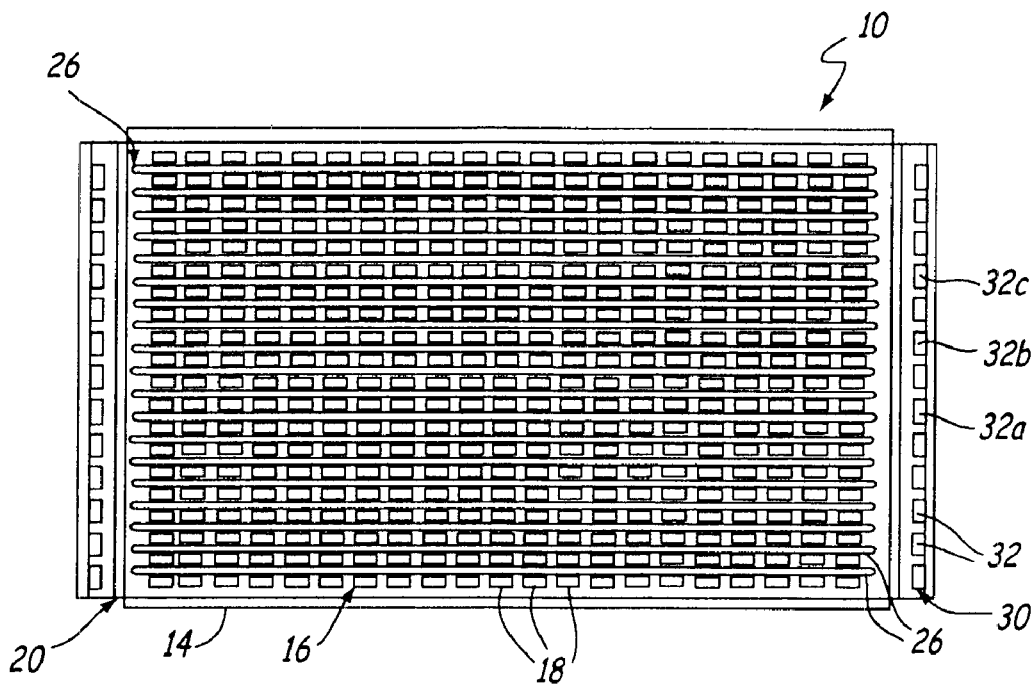
FIG. 1 is a top plan view of an LCD backlight assembly according to an embodiment of the invention.
Figure 2:
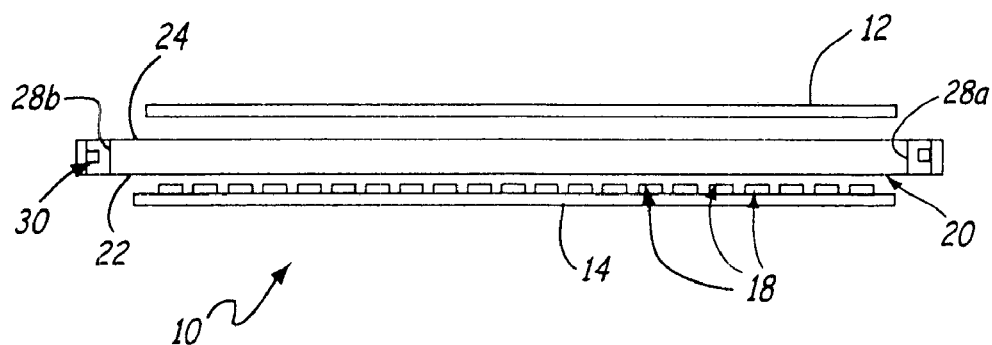
FIG. 2 is a side elevational view of the LCD backlight shown in FIG. 1.

FIGS. 1 and 2 depict a preferred embodiment of a backlight assembly 10 according to the invention. Backlight assembly 10 provides light to an LCD stack, shown schematically at 12. The specific details of the construction of LCD stack 12 do not form part of the invention and therefore will not be further described. Backlight assembly 10 includes a base 14 that has a principal or first LED array 16 disposed thereon. First LED array 16 is comprised of a plurality of LEDs 18 that are selected and arranged according to the lighting and viewing requirements of LCD stack 12. First LED array 16 is designed to provide the substantial majority of the light required for LCD stack 12. Together, LEDs 18 provide light with a first chromaticity, which in the present embodiment is white or near-white.

A waveguide 20 is disposed between base 14 and LCD stack 12. Waveguide 20 is made of a generally planar material that is designed to accept light from one or more light sources and uniformly deliver the light to LCD stack 12. Waveguide 20 has a first major surface 22 that faces base 14. Waveguide 20 has a second major surface 24, generally parallel to first major surface 22, that faces LCD stack 12. Surfaces 22 and 24 are described as being "major" surfaces because these surfaces comprise a substantial majority of the surface area of waveguide 20. A plurality of light-scattering strips 26 are applied to first major surface 22. As shown in FIG. 1, light-scattering strips 26 are preferably white and are painted or etched onto first major surface 22. Light-scattering strips 26 typically do not substantially interfere with the passage of light from first LED array 16 through waveguide 20. Light from second LED array 30 that encounters strips 26 is scattered in a plurality of directions, and a substantial portion of the scattered light is reflected through second major surface 24 toward LCD stack 12.

Waveguide 20 also has an edge surface 28a that is disposed between first and second major surfaces 22, 24. A second LED array 30 is provided adjacent edge surface 28a. Second LED array 30 includes a plurality of LEDs 32 that, individually and/or collectively, emit light with a chromaticity that is different from the chromaticity of light emitted by first LED array 16. For example, second LED array 30 may include a red-light-emitting LED 32a, a green-light-emitting LED 32b, a blue-light-emitting LED 32c, or any combination of these or other colors.

In operation, white light from first LED array 16 enters waveguide 20 through first major surface 22, and colored light from second LED array 30 enters waveguide 20 through edge surface 28. The light from the LED arrays is combined in waveguide 20, thereby altering the chromaticity of the light from first LED array 16. The combined light exits the waveguide through second major surface 24, traveling toward LCD stack 12. Light-scattering strips 26 aid in scattering and reflecting light toward the LCD stack.

Figure 3:
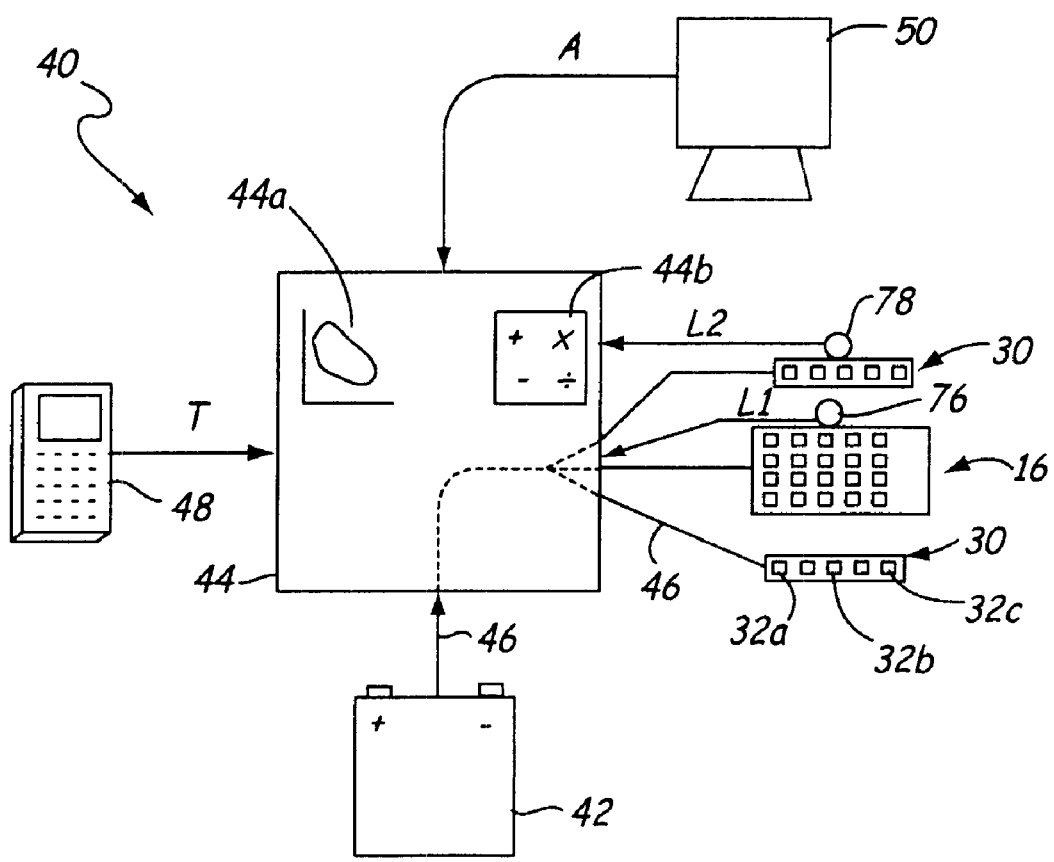
FIG. 3 is a schematic view of a control system that may be used with the invention.

The above configuration may be sufficient to achieve a desired chromaticity if the relevant properties of all of the LEDs in the first and second LED arrays are known and are constant over time. However, as mentioned previously, there may be some variation in the chromaticity of mass-produced LEDs, and these variations may introduce some uncertainty in the expected performance of the LEDs. A control system may therefore be provided to calibrate the chromaticity of the backlight assembly to thereby compensate for such uncertainty. As schematically depicted in FIG. 3, a control system. 40 according to the invention includes a power supply 42 that supplies power to the LED arrays. A controller 44 connects power supply 42 with first and second LED arrays 16, 30 through conductive lines 46. Controller 44 includes a memory 44a in which chromaticity data is stored. Controller 44 also includes a processor 44b that computes a chromaticity correction, as will be described below. An input device 48 is removably connected to the controller. Input device 48 permits a user to give instructions to the controller to adjust the chromaticity of first and second LED arrays 16, 30. A spectroradiometer 50, such as the model-PR-705 spectroradiometer manufactured by Photo Research, Inc., is removably connected to controller 44. Spectroradiometer 50 measures the chromaticity of backlight assembly 10 and provides data to controller 44 regarding such measurement.

In operation, the chromaticity of light emanating from backlight assembly 10 is measured by spectroradiometer 50. If it is desired to adjust the chromaticity of backlight assembly 10, the user inputs a desired or a target chromaticity T into input device 48. The input device transmits target chromaticity T to controller 44. Processor 44b compares target chromaticity T to the actual chromaticity A as measured by spectroradiometer 50. Processor 44b then refers to the chromaticity data stored in memory 44a to determine how to adjust LEDs 32 in second LED array 30 to correct or compensate for the difference between actual chromaticity A and target chromaticity T. Processor 44b then instructs controller 44 to vary the power to LEDs 32 in second LED array 30, thereby varying the brightness of LEDs 32. The exact amount that the power to LEDs 32 is varied depends on the amount of deficiency and on empirically obtained correlation data relating power input and color output of each LED. When the brightness-adjusted light from second LED array 30 is combined in waveguide 20 with light from first LED array 16, the chromaticity of the combined light is also adjusted or changed.

Figure 4:
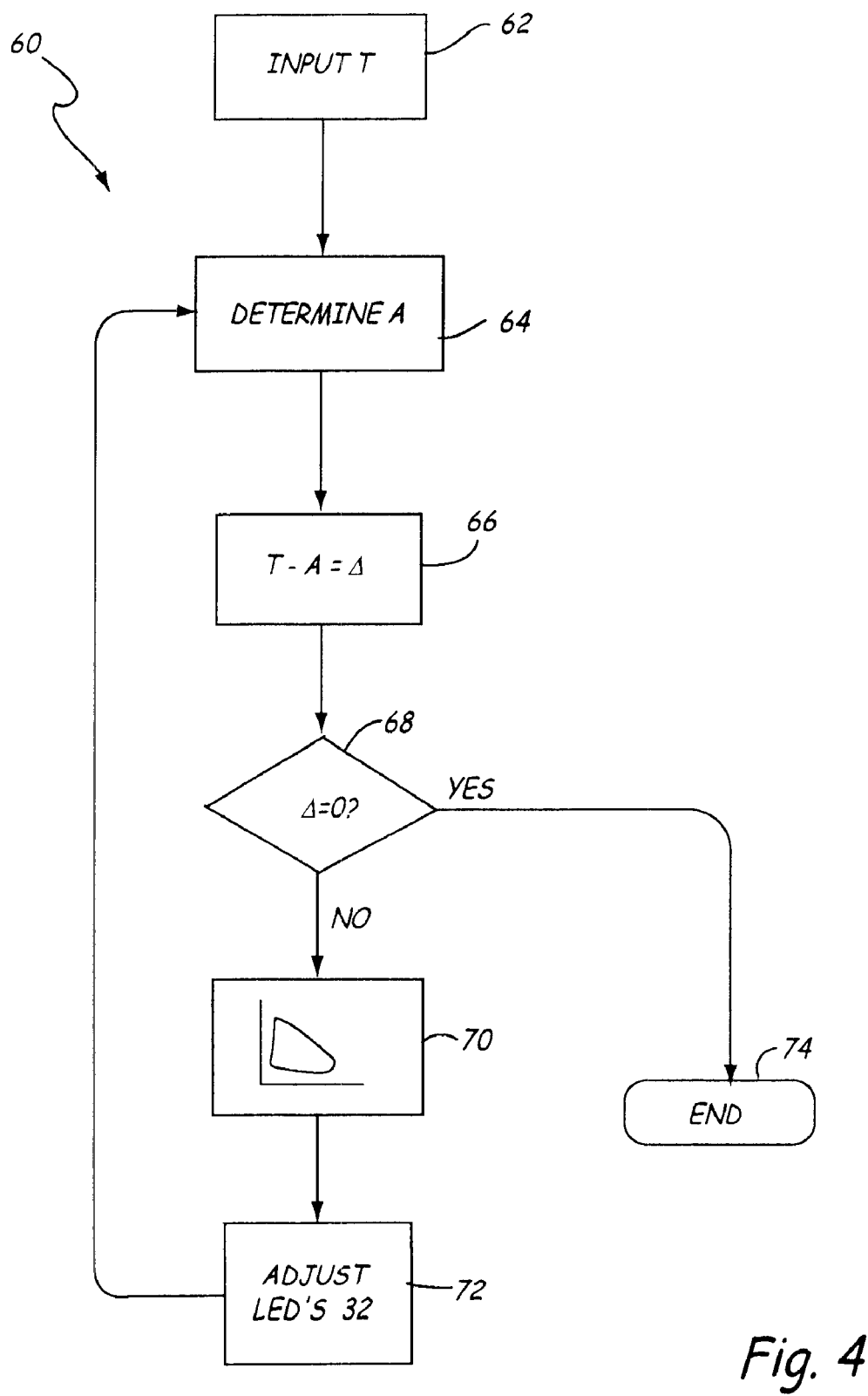
FIG. 4 is a block diagram of sequential instructions for the control system of FIG. 3.

FIG. 4 shows the decision logic 60, used during a calibration operation, that may be employed by control system 40 where a user desires backlight assembly 10 to emit a target chromaticity T. In step 62, the user inputs target chromaticity T into input device 48. In step 64, processor 44b receives the actual chromaticity A as measured by spectroradiometer 50. Actual chromaticity A and target chromaticity T are preferably arrays of numerical values or coordinates representing intensities of different wavelengths of light. In step 66, processor 44b compares actual chromaticity A with target chromaticity T and determines any chromaticity difference Δ therebetween. If chromaticity difference Δ is not zero (step 68), then the processor determines how to adjust power to LEDs 32. For example, it may be determined that the light exiting waveguide 20 is deficient in medium-wavelength light (i.e., green light). In step 70 processor 44b uses the chromaticity data stored in memory 44a to determine how to adjust LEDs 32 in second LED array 30 (step 72) to compensate for such deficiency. In this case the processor may instruct controller 44 to increase power to green LED 32b to increase the brightness of green LED 32b. Alternately or additionally, processor 44b may instruct controller to decrease power to red LED 32a and blue LED 32c. As a result, medium-wavelength light is more prominent in the chromaticity of the light emitted from second LED array 30. This medium-wavelength enhanced light from second LED array 30 is combined in waveguide 20 with light from first LED array 16, and the chromaticity of the combined light exiting waveguide 20 has an increased medium-wavelength light component. Decision logic 60 returns to step 64, where actual chromaticity A is again determined. The decision logic repeats steps 66, 68, 70 and 72 and adjusts LEDs 32 until in step 68 it is determined that there is no difference between actual chromaticity A and target chromaticity T (i.e., Δ=0). Decision logic 60 then ends at step 74. Input device 48 and spectroradiometer are disconnected from controller 44, and LCD backlight is ready for use.

As the chromaticity of individual LEDs may change as a function of time or temperature variation, it may be necessary to periodically re-adjust the chromaticity of backlight assembly 10 after the backlight assembly has been calibrated using decision logic 60. A spectroradiometer or other device that directly measures chromaticity may be integrally included in backlight assembly 10 or may be periodically reattached to controller 44 to periodically adjust the chromaticity. However, due to cost and space considerations of including and maintaining a spectroradiometer for such a purpose, it is preferable to use a spectroradiometer only when initially calibrating the chromaticity, which is done as the backlight is being constructed. Further periodic adjustments to the chromaticity of the backlight assembly are done by indirectly measuring changes in chromaticity. This is done by measuring the change in the relative brightnesses of the first and second LED arrays, which indicates a corresponding change in the chromaticity of the combined light from first and second LED arrays 16, 30. To this end, luminance-measuring devices such as photodiodes are included in the design of the present invention. As shown in FIG. 3, first and second photodiodes 76, 78 are positioned to measure the brightness of the first and second LED arrays, respectively.

Figure 5:
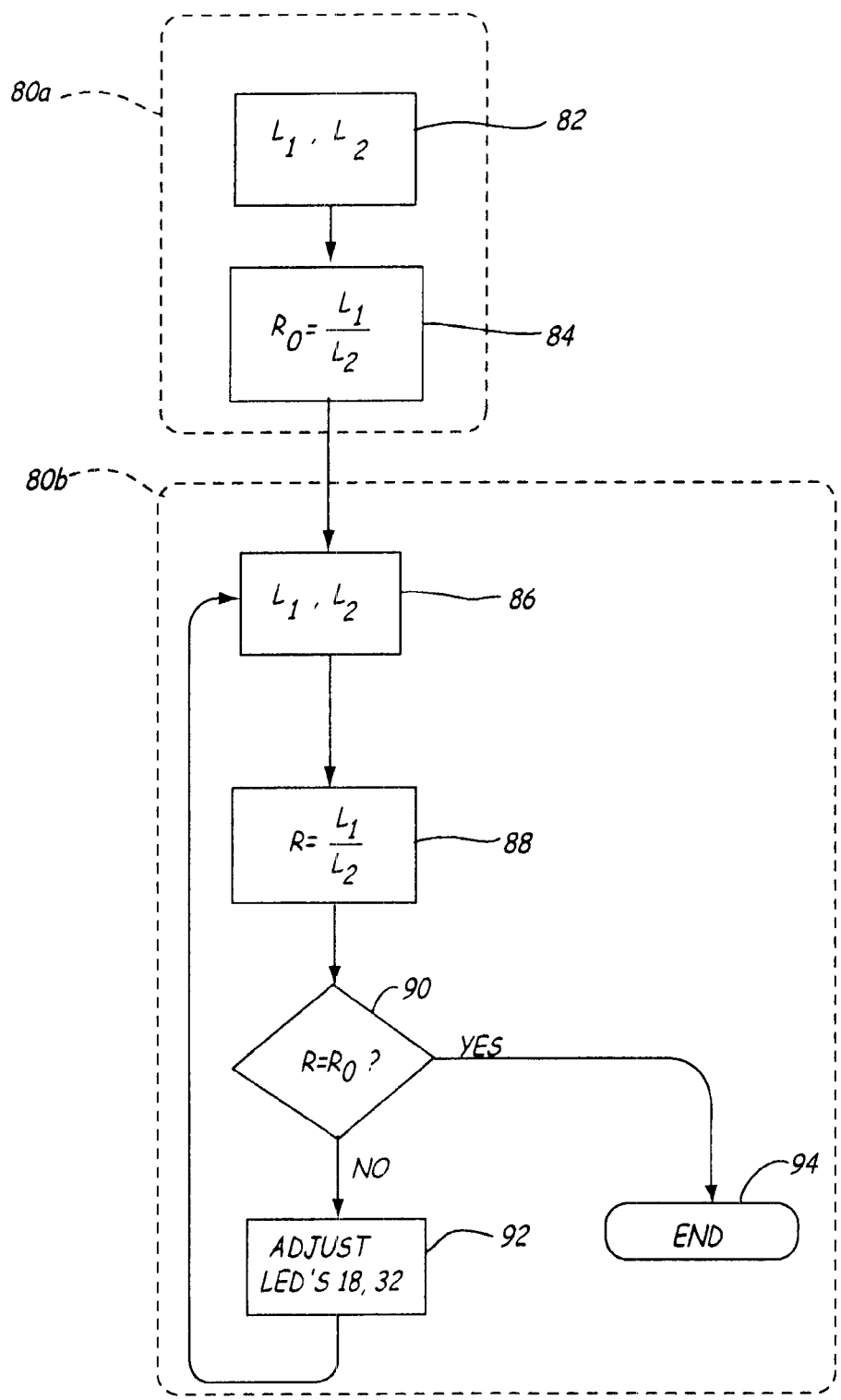
FIG. 5 is a block diagram of more sequential instructions for the control system of FIG. 3.

FIG. 5 shows a set of decision logic 80 that may be used by controller 44 to adjust the chromaticity of the backlight assembly based on changes in relative brightness of the LED arrays. Decision logic 80 includes a preliminary operation 80a that is performed after the chromaticity of the backlight has been initially calibrated as described above. Preliminary operation 80a includes a step 82 in which the luminance $L_1$ of first LED array 16 is measured by first photodiode 76 and the luminance $L_2$ of second LED array 30 is measured by second photodiode 78. In step 84, a baseline ratio $R_0$ of luminances $L_1$ and $L_2$ is calculated by processor 44b and stored in memory 44a. Baseline ratio $R_0$ represents the relative luminance or brightness of the first and second LED arrays when the chromaticity of the backlight has been calibrated using spectroradiometer 50. In a subsequent operation 80b, which controller 44 may be programmed to periodically repeat as desired, the luminances of the LED arrays are measured and compared to the baseline ratio. Specifically, in step 86 luminances $L_1$ and $L_2$ are again measured by first and second photodiodes 76, 78, respectively. In step 88, processor 44b calculates a ratio R, which represents the relative luminance of the first and second LED arrays after a period of use. In step 90, ratio R is compared to baseline ratio $R_0$ that is stored in memory 44a. If there is a difference between ratio R and ratio $R_0$, in step 92 the brightness of first and/or second LED arrays are adjusted to correct the difference. Such adjusting of the relative brightness of the LED arrays also adjusts the chromaticity of the combined light created by the first and second LED arrays. Steps 86, 88, 90 and 92 are repeated until in step 90 it is determined that there is no difference between ratio R and baseline ratio $R_0$. The operation then ends at 94. As previously stated, subsequent operation 80b may be repeated as often as necessary to ensure that the chromaticity of the light supplied by the backlight assembly remains constant over time.

Figure 6:
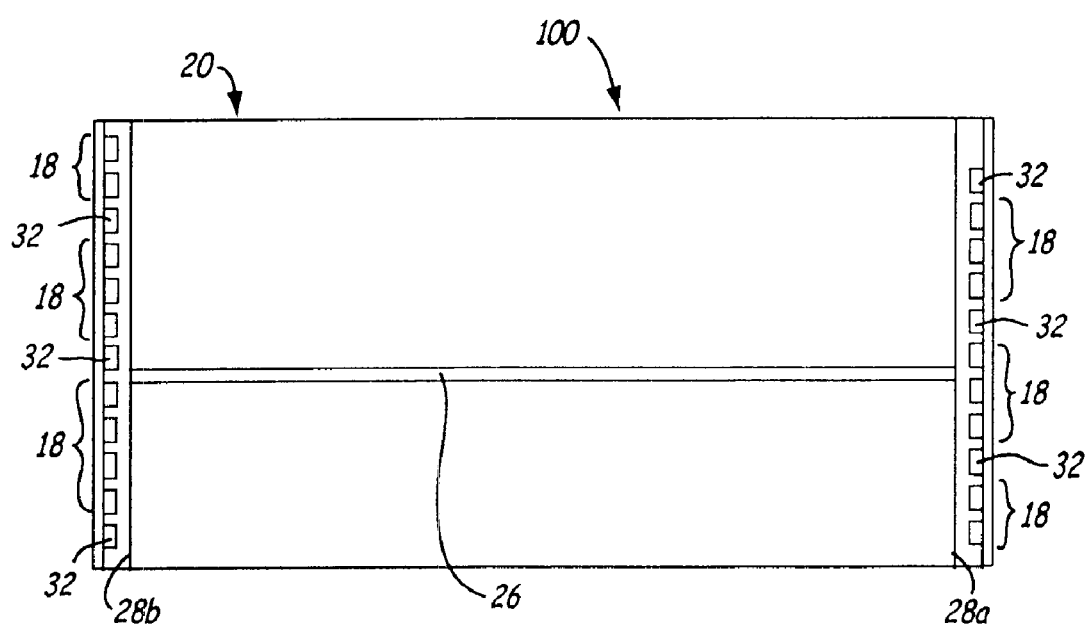
FIG. 6 is a top plan view of an LCD backlight according to another embodiment of the invention.

The invention described thus far has characterized the first LED array as being physically separate from the second LED array. However, it is possible to construct the backlight assembly such that the LEDs from the first and second LED arrays are physically adjacent each other. For example, the embodiment shown in FIGS. 1 and 2 may be modified such that LEDs 32 from second LED array 30 and LEDs 18 from first LED array 16 are intermingled along base 14 and along edge surfaces 28a, 28b. FIG. 6 shows a backlight 100 according to another embodiment of the invention in which LEDs 18 from first LED array 16 are intermingled with LEDs 32 from second LED array 30 along edges 28a, 28b of waveguide 20. Backlight 100 is designed such that no LEDs are positioned to emit light into waveguide 20 through first major surface 22. Light-reflecting strips 26 may therefore be expanded as desired, and may even be replaced by a light-reflecting surface that completely covers the first major surface. A single exemplary light-reflecting strip 26 is shown in FIG. 6, it being understood that the number, size and shape of light-reflecting strips 26 may be varied as desired. Backlight 100 is useful in applications where it is desired to use a solely edge-lit waveguide to provide light to an LCD stack. The invention may also be varied such that a mixed arrangement of LEDs from the first and second LED arrays emits light into waveguide 20 only through first major surface 22. In such a variation no LEDs are disposed adjacent edge surfaces 28a, 28b and it therefore may not be necessary to use waveguide 20. Regardless of whether the first and second LED arrays are physically separate or are intermixed, control system 44 controls the brightness of the LEDs in first array 16 separately from the brightness of the LEDs in second array 30.

The invention may be varied in many ways. For instance, to provide for more uniform mixing of the light from second array 30, the second array may be disposed adjacent more than one edge surface of waveguide 20. As shown in FIGS. 1 and 2, a part of second array 30 is adjacent edge surface 28a, and another part of the second array is adjacent edge surface 28b. It may also be possible that second LED array 30 is comprised of LEDs all having the same chromaticity output. Light-scattering strips 26 may be etched instead of painted onto first major surface 22 of waveguide 20. The brightness adjustment to the LEDs may be accomplished by varying the amount of power to the LEDs, or by pulse width modulation techniques in which the frequency or length of pulses of power to the LEDs is varied. For instance, an LED that is pulsed so that it is on 50% of the time appears to be dimmed when compared to an LED that is not pulsed.

An advantage of the invention is that commercially produced LEDs can be used to meet exacting chromaticity requirements for LCD backlights. This provides significant savings because it is not necessary to custom-build LEDs having specific chromaticity outputs. Furthermore, the invention compensates for the natural chromaticity variation inherent in commercially produced LEDs.

Another advantage of the invention is that the chromaticity of an LCD backlight can be adjusted or tuned to compensate for chromaticity changes of the LED array over a period of time or as a result of naturally occurring temperature variations. This extends the life of the backlight and ensures high-quality output over a long period of use.

Still another advantage is that the chromaticity of an LCD backlight can be adjusted to compensate for faulty individual LEDs in the backlight. This reduces the need to completely replace the backlight due to faulty LEDs.

Yet another advantage is that a regular-production LCD backlight may be custom-tuned according to the requirements of different applications. Eliminating multiple LCD backlight production lines provides significant savings to a manufacturer.

While the invention has been disclosed in its preferred form, the specific embodiments thereof as disclosed and illustrated herein are not to be considered in a limiting sense as numerous variations are possible. The subject matter of the invention includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the invention of the present disclosure.

What is claimed is:

1. A backlight for a liquid-crystal display, comprising:
   a first light-emitting diode (LED) array that provides light with a first chromaticity;
   a second LED array that provides light with a second chromaticity that is different from the first chromaticity, wherein the second LED array includes at least one LED;
   a combining element that combines the light from the first LED and second LED arrays and directs the combined light toward the liquid crystal display; and
   a control system that is operationally connected to the second LED array, wherein the control system selectively varies the brightness of the at least one LED independent of the brightness of the first LED array, thereby adjusting the chromaticity of the combined light, wherein the control system includes a processor that calculates the difference between a target chromaticity of the combined light and an actual chromaticity of the combined light, the control system selectively varying the brightness of the at least one LED to reduce said difference.

2. The backlight of claim 1, wherein the first LED array comprises a plurality of LEDs that emit substantially white light, and wherein the at least one LED in the second LED array emits substantially non-white light.

3. The backlight of claim 1, wherein the chromaticity of the combined light is varied by varying the power to the at least one LED.

4. The backlight of claim 1, wherein the combining element is a substantially planar waveguide.

5. The backlight of claim 4, wherein the waveguide has a first major surface, and wherein the first LED array emits light into the waveguide through the first major surface.

6. The backlight of claim 5, wherein the waveguide has an edge surface that is disposed at a non-parallel angle to the first major surface, and wherein the second LED array emits light into the waveguide through the edge surface.

7. The backlight of claim 5, wherein the second LED array emits light into the waveguide through the first major surface.

8. The backlight of claim 5, wherein the waveguide has a second major surface that is generally parallel to the first major surface, and wherein light that is combined from the first and second LED arrays exits the waveguide through the second major surface to provide light to the liquid crystal display.

9. The backlight of claim 8, wherein the waveguide has a plurality of light-scattering strips disposed on the first major surface, wherein the light hitting the light-scattering strips is substantially reflected toward the second major surface.

10. The backlight of claim 9, wherein the plurality of light-scattering strips are disposed upon the first major surface such that light from the-first LED array is substantially permitted to enter the waveguide through the first major surface, wherein the light in the waveguide hitting the light-scattering strips is substantially reflected toward the second major surface.

11. The backlight of claim 4, wherein the waveguide has an edge surface, and wherein the first LED array and the second LED array emit light into the waveguide through the edge surface.

12. The backlight of claim 1, wherein the control system includes a chromaticity-measuring means that measures the actual chromaticity of the combined light from the first and second LED arrays.

13. A backlight for a liquid-crystal display, comprising:
    a first light-emitting diode (LED) array that provides light with a first chromaticity;
    a second LED-array that provides light with a second chromaticity that is different from the first chromaticity, wherein the second LED array includes at least one LED;
    a combining element that combines the light from the first LED and second LED arrays and directs the combined light toward the liquid crystal display; and
    a control system that is operationally connected to the second LED array, wherein the control system selectively varies the brightness of the at least one LED independent of the brightness of the first LED array, thereby adjusting the chromaticity of the combined light, wherein the control system includes a brightness-measuring means that measures the brightness of at least one of the first and second LED arrays at two predetermined times, the control system selectively varying the brightness of the least one LED of the second LED array in response to a difference in the brightness measured at the two predetermined times, thereby adjusting the chromaticity of the combined light.

14. A method of adjusting the chromaticity of an LCD backlight, the LCD backlight providing light combined from a first light-emitting diode (LED) array and a second LED array, the method comprising:
    obtaining a target chromaticity for the LCD backlight by measuring the brightnesses of the first and second LED arrays;
    determining an actual chromaticity of the LCD backlight;
    calculating a difference between the target chromaticity and the actual chromaticity by determining the change in the ratio of the brightnesses of the first and second LED arrays as measured at two predetermined times; and
    adjusting the brightness of at least one LED in the second LED array, thereby changing the chromaticity of the light combined from the first and second LED arrays and decreasing the difference between the target chromaticity and the actual chromaticity.

15. The method of claim 14, wherein the determining, calculating, and adjusting steps are repeated until the difference between the target chromaticity and the actual chromaticity is substantially zero.

16. The method of claim 14, wherein the LCD backlight includes a power supply that supplies power to the second LED array, and wherein the brightness of the at least one LED in the second LED array is adjusted by varying the power to the at least one LED.

* * * * *